United States Patent [19]
Herzog

[11] 3,869,639
[45] Mar. 4, 1975

[54] EMERGENCY LIGHTING SYSTEM USING DIM TO BRIGHT FLASHING OPERATION

[75] Inventor: Rollie R. Herzog, Danville, Ill.

[73] Assignee: General Electric Company, Indianapolis, Ind.

[22] Filed: Aug. 24, 1973

[21] Appl. No.: 391,076

[52] U.S. Cl. .................... 315/86, 315/87, 307/65
[51] Int. Cl. ........................................ H05b 37/00
[58] Field of Search ............ 315/86, 87; 307/64, 65, 307/66

[56] References Cited
UNITED STATES PATENTS

| | | | |
|---|---|---|---|
| 3,201,592 | 8/1965 | Reinert et al. | 307/64 |
| 3,688,123 | 8/1972 | Walker | 315/86 X |
| 3,801,794 | 4/1974 | Mauch et al. | 307/66 |

*Primary Examiner*—Nathan Kaufman

[57] ABSTRACT

A circuit is provided to operate at least one gaseous discharge lamp during normal conditions and during emergency conditions. A first transformer is connected between an AC input and a full wave diode bridge. The diode bridge is connected to an LC inverter-oscillator which controls the gaseous discharge lamp. The inverter-oscillator includes a second transformer having primary and secondary windings and a tuning winding. A first capacitor is connected across the tuning winding and, in part, determines the frequency of the inverter-oscillator. The inverter-oscillator is connected to a DC battery which is a source of emergency power. The battery is further connected to a first transistor switch. If AC line failure occurs, an emergency circuit is automatically switched into operation. The first transistor switch, which is connected to another oscillator, comes on when line voltage fails, thus initiating the other oscillator. The other oscillator includes a programmable unijunction transistor having a timing capacitor connected to its anode. The cathode of the programmable unijunction is further connected directly to a second transistor switch which is gated on and off as the other oscillator provides pulses. The second transistor is connected to a tuning capacitor which in part, determines the frequency of the inverter-oscillator during emergency conditions. The tuning capacitor is connected to the tuning winding of the second transformer. The tuning winding is magnetically coupled to the other windings of the inverter-oscillator. The frequency of the LC inverter-oscillator is lowered when the second transistor is switched on. A ballast capacitor is connected to the secondary winding of the second transformer. The lowering of frequency of the inverter causes the ballast capacitor's impedance to rise, thus, causing the lamp to dim. During emergency conditions, therefore, the lamp is switched between dim and bright.

7 Claims, 1 Drawing Figure

EMERGENCY LIGHTING SYSTEM USING DIM TO BRIGHT FLASHING OPERATION

BACKGROUND OF THE INVENTION

This invention relates to an improved emergency lighting system for gaseous discharge lamps. More particularly, this invention relates to emergency lighting for exit signs having a means of periodically changing the impedance of a ballast during line power failure so that the light output of a gaseous discharge lamp changes periodically during emergency conditions.

A reliable emergency lighting system is important today in view of numerous line power failures and the fact that many people are sheltered in high rise buildings. Without proper emergency lighting these people could be trapped in darkened halls and stairways. Emergency lighting for exit signs and for general lighting is very important when line power fails in such locations.

In the past there have been several different methods of providing emergency lighting or emergency warning light during line power failure. One simple method was to provide a second lamp which was switched on by an independent circuit when line failure occurred. The second lamp and the independent circuit were powered by a battery. This method proved unsatisfactory because of the necessity of two lamps and because there was no real indication of line failure or that the emergency situation existed.

Gas tube flash lamps, operated from batteries, have been provided to give a warning signal at highway constructions. These flash lamps are designed to flash on and off, however, general lighting gas lamps, such as fluorescent types, have a relatively short life when they are turned completely off and on repeatedly. While the full scope of applicant's invention includes repeatedly slowly turning the lamp completely off and then back on, the preferred embodiment shows a dim to bright system for longer lamp life and further, so that some light is available at all times.

It is, therefore, desirable to provide an emergency system which will indicate the existence of an emergency and provide reasonably long lamp life.

SUMMARY OF THE INVENTION

Accordingly, it is a general object of this invention to provide an emergency lighting system which switches on automatically during line voltage failure.

Another object is to provide an emergency lighting system where light levels range between dim and bright.

Another object is to provide an emergency lighting system for use with at least one gaseous discharge type lamp in which the impedance of the lamp ballast is varied during emergency operation.

Another object is to provide a lighting system which operates a lamp in a normal bright mode when the line voltage is normal and a dim-bright flashing mode when the line voltage fails.

In accordance with one form of the invention there is provided an inverter-oscillator circuit, including a transformer having at least primary, secondary, and tuning windings, which controls a gaseous discharge lamp. The lamp is reactively ballasted by a device such as a capacitance means. During normal line voltage operation, when AC power is connected to the inverter-oscillator, the lamp operates at full brightness. There is further provided an emergency circuit which is energized automatically to operate the lamp when the AC line voltage is interrupted. This emergency circuit is connected to a DC battery which provides power during the emergency. The emergency circuit includes a first switch which is automatically initiated when the AC power goes off. The first switch is further connected to a second oscillator for initiating the second oscillator. The output of the second oscillator is connected to a second switch which is responsive to the second oscillator. The second switch is connected to a tuning means, including a first and a second tuning capacitance means and a tuning winding, which is magnetically coupled to the first oscillator. During normal operation the tuning means oscillates at a first frequency utilizing the tuning winding and the first tuning capacitance means. When the emergency circuit is switched on, the second tuning capacitance means is switched into a circuit relation with the tuning means resulting in a second frequency. Since the tuning winding is coupled to the other windings in the first oscillator, its frequency will also change. This change of frequency is induced into the secondary winding of the transformer which couples the first oscillator to the lamp. The ballast capacitance means which is connected to the secondary winding, will also undergo a periodic change in frequency. Impedance of the ballast capacitance means will change as a function of the frequency in an inverse relationship. That is, as the frequency of the inverter goes down the impedance of the ballast capacitance means goes up. Therefore, less current passes through the lamp and the light level of the lamp is lowered. This lowering of frequency will occur each time the second switch comes on. Therefore, the light output will vary from full intensity to low intensity giving a definite warning signal when AC line voltage is interrupted. Furthermore, by using this method of flashing, the cathodes of the lamp are not adversely affected as happens when flashing from full light to zero light.

BRIEF DESCRIPTION OF THE DRAWING

The subject matter regarded as the invention is set forth in the appended claims. The invention itself, however, together with further objects and advantages thereof will be better understood by reference to the following description taken in conjunction with the accompanying drawing in which:

DESCRIPTION OF THE PREFERRED EMBODIMENT

Figure 1:
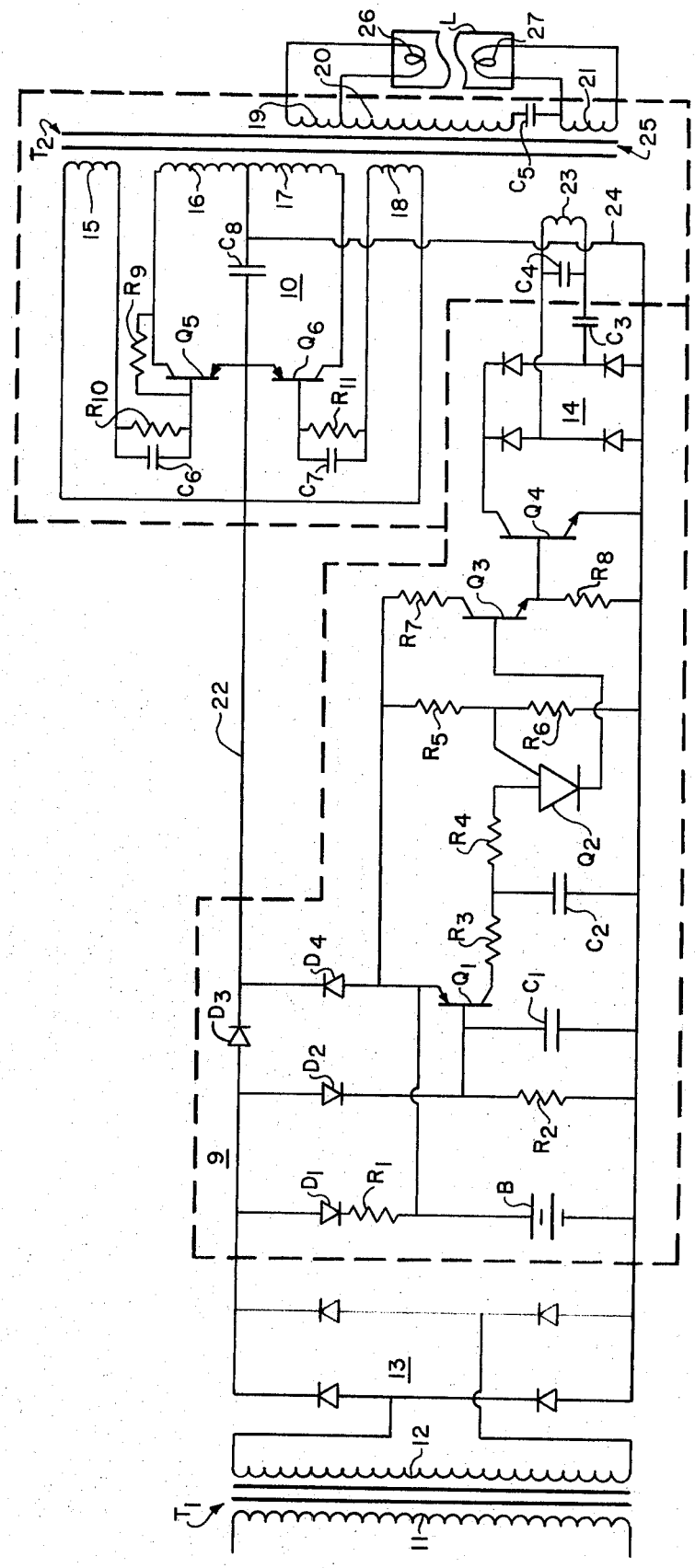
FIG. 1 is a circuit diagram of an improved emergency lighting flashing system incorporating one form of the present invention.

Referring to FIG. 1 the improved emergency lighting system comprises a circuit which provides full intensity lamp output during normal AC operation and flashing lamp output during emergency operation. Transformer $T_1$, including primary winding 11 and secondary winding 12, receives AC line voltage across its primary winding 11. Secondary winding 12 is connected to full wave diode bridge 13 to provide a pulsed DC. Diode bridge 13 is connected to LC inverter-oscillator 10 through DC blocking diode $D_3$. The inverter part of the circuit is a standard type inverter circuit for DC to sine wave conversion used to operate gaseous discharge lamps. The operation and structure of a similar inverter is disclosed in U.S. Pat. No. 3,020,491, issued to Kurtz on Feb. 6, 1962. The inverter includes transistors $Q_5$ and $Q_6$ which are tied together by their emitters. These emitters are connected to diode $D_3$ through line 22 to receive input power. Starting resistor $R_9$ is connected between the base and collector of transistor $Q_5$ to insure that the two transistors do not conduct simultaneously. Capacitor $C_6$ and resistor $R_{10}$, which are connected in parallel, provide base bias for transistor $Q_5$. Capacitor $C_7$ and resistor $R_{11}$, which also are connected in parallel, provide base bias for transistor $Q_6$. Capacitor $C_8$ is connected to the emitter of transistors $Q_5$ and $Q_6$ and further across input power through lines 22 and 24.

The inverter-oscillator 10 further includes transformer $T_2$ having primary windings 16 and 17, feedback windings 15 and 18, tuning winding 23, secondary winding 20, and heater windings 19 and 21 mounted on core 25. Primary winding 16 has one side connected to the collector of transistor $Q_5$ and the other side to capacitor $C_8$, primary winding 17, and power line 24. Feedback winding 15 is magnetically coupled to primary winding 16. One side of winding 15 is connected to the parallel combination of resistor $R_{10}$ and capacitor $C_6$ while the other side is connected to the emitter of transistor $Q_5$ for biasing $Q_5$ on and off. Primary winding 17 is connected to the collector of transistor $Q_6$ and to power line 24. Feedback winding 18 is magnetically coupled to primary winding 17. One side of winding 18 is connected to the parallel combination of resistor $R_{11}$ and capacitor $C_7$ while the other side is connected to the emitter of transistor $Q_6$ to bias $Q_6$ on and off. Tuning winding 23 is connected in parallel with capacitor $C_4$ and is magnetically coupled to the other windings in the inverter-oscillator circuit 10. This tuning winding together with capacitor $C_4$ will affect the frequency of the inverter-oscillator. Tuning winding 23 is also connected to emergency flashing circuit 9, which will be pointed out in detail later.

Heating windings 19 and 21 are connected to lamp filaments 26 and 27 to provide heat for the filaments. One end of secondary winding 20 is connected to heating winding 19 and to one side of lamp L at filament 26 while the other end of the secondary winding is connected to ballast impedance capacitor $C_5$. Ballast capacitor $C_5$ is further connected to heating winding 21 and the other side of gaseous discharge lamp L at filament 27. The impedance of capacitor $C_5$ is inversely proportional to the frequency of inverter-oscillator 10. The light output of the lamp is thus directly proportional to this frequency. While the circuit is operating on normal line power, the inverter frequency is nearly constant and relatively high, and the lamp output is steady and bright.

The emergency flashing circuit 9 includes diode $D_1$ and resistor $R_1$ connected in series to battery B. This series arrangement is connected across diode bridge 13 and is used to charge the DC battery B to a voltage level slightly less than the peak voltage available from winding 12 of transformer $T_1$. Diode $D_2$ connects capacitor $C_1$ to bridge 13 to provide a charging path for that capacitor during normal AC line operation. Resistor $R_2$ is connected across capacitor $C_1$ and provides a discharge path for capacitor $C_1$ when the AC voltage is interrupted. The base of transistor switch $Q_1$ is connected to capacitor $C_1$ and the emitter is connected to the positive side of battery B. The emitter of transistor $Q_1$ is connected to line 22 by diode $D_4$ which is poled in the direction to block line current from entering the emitter of transistor $Q_1$. During normal AC operation the charge on capacitor $C_1$ biases the transistor $Q_1$ off, however, when the AC supply is interrupted capacitor $C_1$ discharges through resistor $R_2$ and the voltage on the base of transistor $Q_1$ becomes negative with respect to its emitter and transistor $Q_1$ conducts. Diode $D_3$ is connected between diode $D_4$ and diode $D_2$. Diodes $D_3$ and $D_1$ are poled in such a direction as to block current from battery B from the base of transistor $Q_1$.

Resistors $R_5$ and $R_6$ are connected in series across battery B and form a voltage divider. A programmable unijunction transistor (PUT) $Q_2$ is provided having its gate connected to the voltage divider between $R_5$ and $R_6$. The anode of PUT $Q_2$ is connected to the collector of transistor $Q_1$ through series resistors $R_3$ and $R_4$. Capacitor $C_2$ is connected to the junction of resistors $R_3$ and $R_4$ and to line 24. PUT $Q_2$ conducts when the voltage on capacitor $C_2$ exceeds the voltage at the PUT gate. The PUT and capacitor $C_2$ function as an oscillator. The cathode of PUT $Q_2$ is connected to the base of transistor $Q_3$ to provide pulses for transistor $Q_3$. Biasing resistors $R_7$ and $R_8$ are connected to the collector and emitter respectively of transistor $Q_3$. Transistor $Q_3$ has its emitter connected to the base of transistor $Q_4$. Transistor $Q_4$ is connected across diode bridge 14 to form a bilateral switch. Current flows in either direction through this bilateral switch. Capacitor $C_3$ is connected to diode bridge 14 and to a tuning winding 23 which is coupled to the remaining windings in inverter-oscillator 10. Capacitor $C_4$ and winding 23 form a tuning circuit which, in part, determines the frequency of operation of inverter-oscillator 10 while normal power is used. However, during emergency operation, transistor $Q_4$ is periodically switched into conduction, which allows current to flow through capacitor $C_3$. This changes the frequency of the tuning circuit. This, in turn, affects the frequency of operation of inverter-oscillator 10 because the tuning circuit is magnetically coupled to the other inverter-oscillator windings. When capacitor $C_3$ is switched into the tuning circuit the frequency of the inverter-oscillator is lowered in the exemplification embodiment. When transistor $Q_4$ is turned off by the lack of an output pulse from PUT $Q_2$, capacitor $C_3$ is switched out of the tuning circuit and the frequency of inverter-oscillator 10 increases.

Capacitor $C_5$, previously described as the ballast capacitor, is connected to secondary winding 20 and to filament 27 of a lamp L. The impedance of ballast capacitor $C_5$ is inversely proportional to the frequency of the inverter-oscillator 10. While the inverter-oscillator is operating under normal conditions the frequency is relatively high, the impedance of capacitor $C_5$ is relatively low, and the light output of lamp L is relatively high. When line voltage fails and the emergency circuit 9 is switched on, the frequency of the inverter-oscillator 10 varies from high to low. The impedance of capacitor $C_5$ varies from low to high and the light output of lamp L varies from high to low respectively. Other reactive ballasts, such as inductors, could be used with a different frequency-impedance relationship. This would require operating the inverter-oscillator at another frequency.

During normal AC power operation, power is received across the primary winding 11 of transformer $T_1$ and voltage is induced in the secondary winding 12. The AC current from winding 12 is rectified by diode bridge 13. Capacitor $C_1$ is charged through diode $D_2$ holding transistor $Q_1$ off. Diode bridge 13 provides power for the LC inverter-oscillator 10 which provides alternating current sine waves. The primary windings 16 and 17 of transformer $T_2$ induce voltage in secondary winding 20 and heating windings 19 and 21 sufficiently to start and maintain current flow in gaseous discharge lamp L. Capacitor $C_5$ provides ballasting for the lamp and its impedance is determined by the frequency of oscillation of inverter 10. In the normal mode of operation the lamp operates at a high light output.

During the emergency mode of operation, that is when AC line current is interrupted, battery B provides power to the inverter circuit 10 through diode $D_4$. Furthermore, battery B provides bias for the emitter of transistor $Q_1$, the gate of PUT $Q_2$ and the collector of transistor $Q_3$. When the AC power is interrputed capacitor $C_1$ discharges through resistor $R_2$ thereby removing the positive turnoff bias for the transistor $Q_1$. Transistor $Q_1$ then comes on and current flows from battery B through the emitter-collector path of transistor $Q_1$ and through resistor $R_3$ to charge capacitor $C_2$. When capacitor $C_2$ is charged to a value which exceeds the bias on the gate of PUT $Q_2$, it discharges through resistor $R_4$ and the anode-cathode path of the PUT. This provides periodic pulses which turn on transistor $Q_3$ at a rate determined by the charge and discharge rate of capacitor $C_2$. When transistor $Q_3$ comes on, current flows through its collector-emitter path thereby turning on transistor $Q_4$. Transistor $Q_4$ has full wave diode bridge 14 connected across its collector and emitter to provide for bilateral conduction. Capacitors $C_3$ and $C_4$ and tuning winding 23 are connected to diode bridge 14 and oscillate at a predetermined frequency. Tuning winding 23 is magnetically coupled to the other windings in inverter-oscillator circuit 10. When transistor $Q_4$ is switched on, allowing current to flow through capacitor $C_3$ and thus be switched into the tuning circuit, the frequency of the inverter-oscillator 10 is lowered. Lowering the frequency of the inverter causes the impedance of capacitor $C_5$, which is connected to the secondary winding, to be increased. Since the impedance of ballast capacitor $C_5$ is increased the current through the lamp will decrease, therefore, the light output of the lamp will be less. Thus, the light output of the lamp will flash between dim, when transistor $Q_4$ is on, and bright when transistor $Q_4$ is off.

In order to enable one skilled in the art to more readily understand the circuit of FIG. 1, the following list of component values have been provided:

Resistors
$R_1$ — 120 ohms
$R_2$ — 1 meg
$R_3$ — 5 k
$R_4$ — 50 k
$R_5$ — 1 meg
$R_6$ — 10 meg
$R_7$ — 1 K
$R_8$ — 1 K
$R_9$ — 2.2 K
$R_{10}$ — 150 ohms
$R_{11}$ — 150 ohms
Diode Bridge 13 — 3A to 10A bridge
Diode Bridge 14 — GEN. INST. W04
Diodes
$D_1$ — IN5059
$D_2$ — IN5059
$D_3$ — IN5059
$D_4$ — IN5059
Capacitors
$C_1$ — 0.1 uf
$C_2$ — 100 uf
$C_3$ — 2.2 uf
$C_4$ — 0.33 uf
$C_5$ — 0.0025 uf
$C_6$ — 1 uf
$C_7$ — 1 uf
$C_8$ — 200 uf
Transformer $T_1$ — steel laminations
  winding 11 — 1,000 turns
  winding 12 — 200 turns
Transformer $T_2$ — ferrite
  windings
    15 — 6 turns
    16 — 15 turns
    17 — 15 turns
    18 — 6 turns
    19 — 5 turns
    20 — 806 turns
    21 — 5 turns
    23 — 66 turns
Battery B — 18 volts nickel cadmium
Transistor
  $Q_1$ — 2N5367
  $Q_3$ — TIS98
  $Q_4$ — D42C5
  $Q_5$ — 2N3615
  $Q_6$ — 2N3615
PUT $Q_2$ — 2N6027
Lamp L — F40WT12RS From the foregoing description of an embodiment of the invention it will be apparent that many modifications may be made in the exemplification without departing from the invention. It will be understood, however, that this embodiment of the invention is intended as an exemplification of the invention only and that the invention is not limited thereto. For example PUT $Q_2$ may be replaced by a UJT (unijunction transistor) with appropriate circuit changes. It will be understood, therefore, that it is intended in the appended claims to cover all such modifications as fall within the true scope and spirit of the invention.

What is claimed is:

1. A circuit for operating at least one gaseous discharge lamp during both normal and emergency conditions comprising:
    input means for connecting the circuit to a first source of power providing operating voltage during normal conditions when the first power source is operative;
    a first oscillator connected to said input means for applying voltage to the lamp at a predetermined frequency thereby to yield a single light level;
    means for automatically connecting a second source of power to said first oscillator when the first power source is inoperative for providing operating voltage for said first oscillator during emergency conditions; and
    means for cyclically varying the frequency of said first oscillator in a predetermined range during emergency conditions such that the light level of the lamp varies cyclically.

2. The circuit as set forth in claim 1 further including: a ballast impedance connected to the at least one lamp and coupled to said first oscillator whereby the impedance of said ballast impedance varies in a predetermined relationship with the frequency of said first oscillator. pg,15

3. The circuit as set forth in claim 2 wherein said first oscillator includes:
a transformer having at least one primary winding, a secondary winding, and a tuning winding, said tuning winding being coupled to said primary and secondary windings and further connected to said first oscillator frequency varying means for varying the frequency of said first oscillator between a first rate and a second rate during emergency conditions.

4. The circuit as set forth in claim 3 further including:
a first switch connected to the second source of power and arranged to automatically turn on when the first power source is inoperative;
a second switch connected to said tuning winding;
a second oscillator connected between said first switch and said second switch, said second oscillator being initiated by the turning on of said first switch;
said second switch being turned on at time intervals determined by the frequency of said second oscillator.

5. The circuit as set forth in claim 3 wherein said ballast impedance includes a ballast capacitance means, said ballast capacitance means being connected to said secondary winding of said transformer.

6. The circuit as set forth in claim 4 further including:
a first tuning capacitance connected to said tuning winding, said first tuning capacitance being in part determinitive of the frequency of said first oscillator during normal conditions and for a first time portion during emergency conditions;
a second tuning capacitance connected to said tuning winding and to said second switch, said second capacitance being switched into a circuit relationship with said first oscillator upon the turning on of said second switch, said second tuning capacitance being in part determinitive of the frequency of said first oscillator for a second time portion during emergency conditions.

7. A circuit for operating at least one gaseous discharge lamp during both normal and emergency conditions, said circuit comprising:
input means for connecting the circuit to a source of power for energizing the circuit during normal conditions;
connection means for connecting the circuit to a battery for energizing the circuit during emergency conditions when the power source is inoperative;
charging means connected to said input means for charging the battery during normal conditions;
an inverter-oscillator coupled to said input means and to said connection means for applying operating voltage to the lamp to yield a single light level during normal conditions and a cyclically varying light level during emergency conditions, said inverter-oscillator including a transformer having first and second primary windings, a secondary winding, and a tuning winding, the windings being magnetically coupled together;
a first transistor switch having its emitter connected to the battery and arranged to be automatically switched into conduction during the emergency conditions;
a programmable unijunction transistor having an anode terminal, a cathode terminal, and a gate terminal, said anode terminal being connected to the collector of said first transistor switch, said gate terminal being connected to the battery;
a first capacitance means, one side thereof connected between said collector of said first transistor switch and said anode of said programmable unijunction transistor, for discharging said first capacitance through said programmable unijunction transistor at a predetermined frequency;
a second transistor switch having its base connected to said cathode terminal of said programmable unijunction transistor, said second transistor switch responsive to pulses from said programmable unijunction transistor to be turned on;
a third transistor switch having its base connected to the emitter of said second transistor switch, said third transistor switch being turned on during each discharge of said first capacitance means and in response to the turning on of said second transistor switch for supplying current to said tuning winding;
a full wave rectifier connected betwen the collector and emitter of said third transistor switch for providing bilateral conduction thereof;
means for cyclically varying the frequency of said inverter-oscillator in a predetermined range including a second capacitance means connected between said full wave rectifier and said tuning winding for substantially affecting the frequency of said inverter-oscillator when said third transistor switch conducts, and a third capacitance means connected across said tuning winding for substantially affecting the frequency of said inverter-oscillator when said third transistor switch is non-conductive;
a ballast capacitance means connected to said transformer secondary winding, the impedance of said ballast capacitance means varying as the frequency of said inverter-oscillator varies for varying the light level of the lamp during emergency conditions.

* * * * *